United States Patent [19]

Cutore

[11] Patent Number: 5,595,224
[45] Date of Patent: Jan. 21, 1997

[54] RETRACTABLE AND CONCEALABLE FUEL DELIVERY INSTALLATION

[76] Inventor: Gaetano Cutore, Sift Casella Postale 72 I-00040, Montecompatri (Rome), Italy

[21] Appl. No.: 373,228
[22] PCT Filed: Jul. 13, 1993
[86] PCT No.: PCT/IT93/00075
§ 371 Date: Mar. 2, 1995
§ 102(e) Date: Mar. 2, 1995
[87] PCT Pub. No.: WO94/01327
PCT Pub. Date: Jan. 20, 1994

[30] Foreign Application Priority Data

Jul. 14, 1992 [IT] Italy ................ RM92A0537

[51] Int. Cl.⁶ ................................... B65B 3/00
[52] U.S. Cl. .................... 141/388; 141/387; 141/279; 137/234.6; 137/615; 244/114 R; 244/135 R
[58] Field of Search ................... 141/279, 382, 141/387–389; 137/234.6, 355.12, 615; 244/114 R, 135 R, 135 A

[56] References Cited

U.S. PATENT DOCUMENTS

| | | | |
|---|---|---|---|
| 1,773,484 | 8/1930 | Harks | 137/234.6 |
| 2,084,548 | 6/1937 | Bennett | 137/234.6 |
| 2,507,597 | 5/1950 | Holdridge | 137/234.6 |
| 2,642,957 | 6/1953 | Watts et al. | |
| 2,769,575 | 11/1956 | Harman et al. | 244/114 R |
| 4,269,240 | 5/1981 | Cutore | 137/234.6 X |
| 4,510,971 | 4/1985 | Bunelle | 137/615 |
| 4,993,463 | 2/1991 | Von Meyerinck et al. | 141/387 |

FOREIGN PATENT DOCUMENTS

| | | |
|---|---|---|
| 0686834 | 1/1940 | Germany. |
| 7318246 | 11/1975 | Germany. |
| 9100214 | 1/1991 | WIPO. |

Primary Examiner—J. Casimer Jacyna
Attorney, Agent, or Firm—Browdy and Neimark

[57] ABSTRACT

A retractable, concealable peripheric gas station for refuelling in particular military vehicles, which is connected to a main station supplying it both with fuel and hydraulic fluid and has an outer metal tank (10) closed by an upper cover (11) hinged thereto, a metal frame (14) hinged under the cover so as to pivot between a lowered rest position and a raised operating position, a take-up reel (15) for a hose supplying fuel, and a hydraulic assembly (24) operating between the frame and the tank under control of the oleodynamic main station which causes the frame to pivot between the lowered and raised positions.

4 Claims, 3 Drawing Sheets

RETRACTABLE AND CONCEALABLE FUEL DELIVERY INSTALLATION

FIELD OF THE INVENTION

The present invention relates to a peripheric gas station especially, but not exclusively, suitable for delivering fuel to military vehicles.

DESCRIPTION OF THE RELATED ART

A peripheric gas station is intended to operate together with a number of identical stations of protected, concealable fuel delivering installations that are especially, but not exclusively, for military plants in which it is necessary to carry out the so-called "hot refuelling", i.e. delivering fuel at the same time to several vehicles with running motors.

U.S. Pat. No. A-2642957 describes a gasoline dispensing system having submerged fuel storage tanks and distributing piping leading to a number of elevatable units normally contained within a submerged pit casing having a platform extension movable to a position to bridge across the wing of an airplane for fuel servicing therof.

DE-U-7318246 describes an underground concealable fuel dispensing station for aircrafts or motor vehicles comprising a hinged cover on which a support for a reel of a dispensing hose is secured which is supplied with fuel from an underlying storage tank and a pump and electric motor unit.

SUMMARY OF THE INVENTION

The gas station of this invention is, in more detail one of the peripheric gas stations of a self-contained concealable refuelling system to be used especially, but not exclusively, in military installations such as airports, heliports, armoured division groups and the like.

This system includes: a fuel supplying source such as, for example, the pipe of a delivering piping system or one or more buried tanks; a main remotely controlled delivery station connected to the fuel supplying source including an electropump and an oledynamic station; a fuel delivering piping network from the main station to each peripheric gas station; a pipe network for delivering the hydraulic fluid operating the hydraulic drive means of the peripheric gas stations; and an electric system supplying the peripheric control means with power.

More particularly, each peripheric gas station includes: an outer metal tank shaped as a parallelepiped; a rectangular cover of such tank formed of a reinforced plate hinged at one side of the tank so as to open like a shutter; a metal frame hinged at the same side of the tank as the above plate so as to pivot about said hinge; a hydraulic cylinder and piston assembly for lifting and lowering the metal frame; a supplying hose provided with delivery gun; a rotatable take-up reel for said hose supported by the frame; a meter of the delivered fuel; a fuel filter; two gauges; a fire protection device. The metal tank is received and secured to a "hole" dug into the ground, the cover plate being flush therewith, and is surrounded by a gutter protected by gratings for carrying rain away.

The peripheric gas station according to the invention can take on both a rest position because of its structure described above, in which all of the component parts are received into the tank as well as protected by the cover plate and concealed, and an operative position in which the cover plate is pivoted and the frame projects upwards from the ground so that the hose can be unwound from the take-up reel in order to reach the vehicle to be refuelled, and the refuelling station can be operated and controlled.

As mentioned above the drive system for the peripheric gas station is of the oleodynamic type and includes a cylinder and piston assembly which operates between the hinged frame and the wall of the tank The raising of the frame causes the cover plate to pivot, the arrangement being such that the station has a reduced height size in the raised position.

BRIEF DESCRIPTION OF THE DRAWING

This invention will now be described more in detail with reference to the accompanying drawings which show an embodiment of the invention arranged at an airport.

In the drawings.

DESCRIPTION OF THE PREFERRED EMBODIMENT

Figure 1:
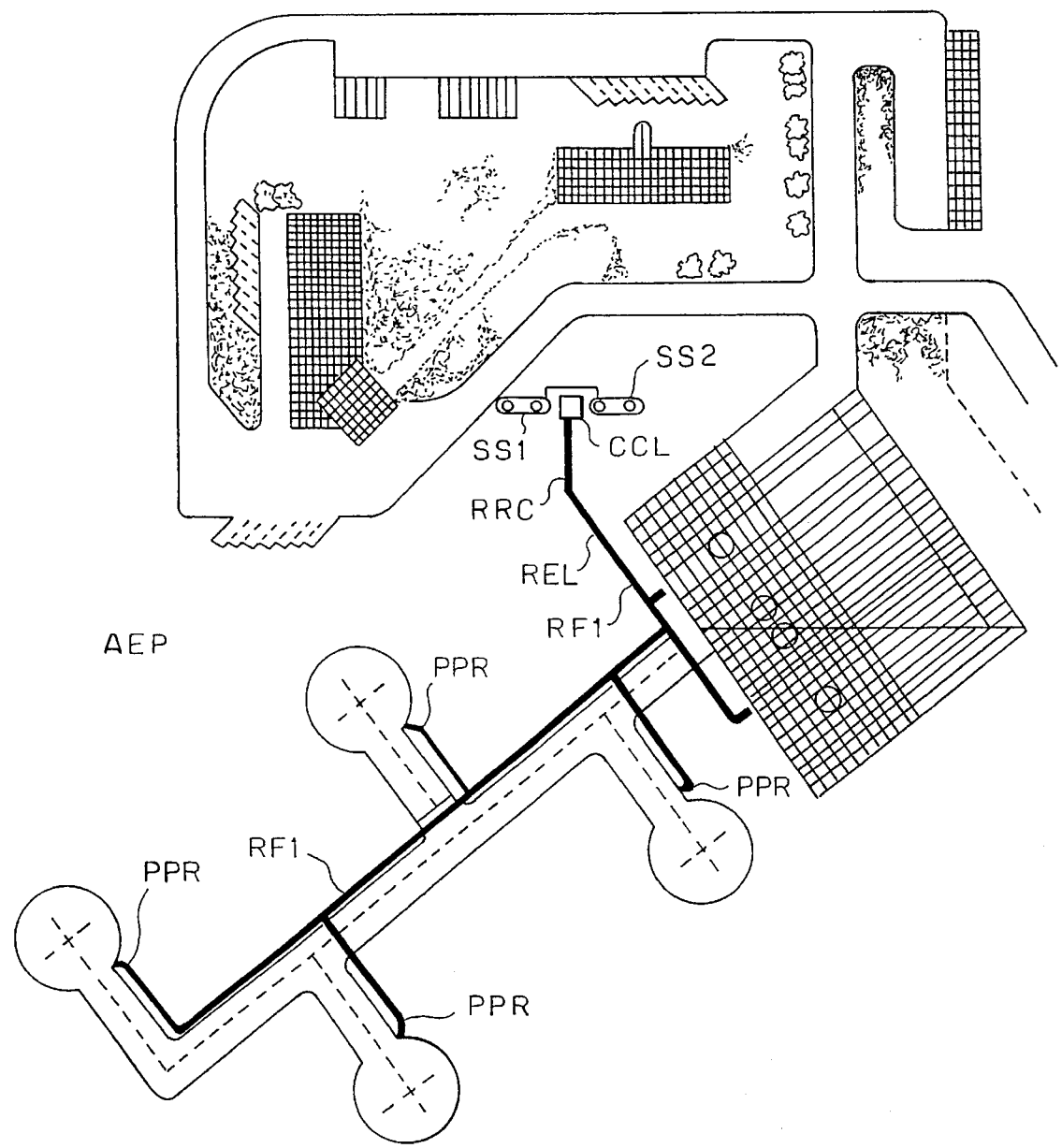
FIG. 1 is the airport lay-out, in which there are shown the fuel tanks the delivering main station and four peripheric stations according to the invention forming four peripheric refuelling points.

For a better understanding of the invention, FIG. 1 shows schematically an embodiment for an airport AEP (i.e., the entire airport, from the Italian "AEroPorto"). including the essential components operating together with the refuelling station system of the invention.

In the figure references SS1 and SS2 designates the fuel tanks for refuelling aircrafts. CCL is the main station; PPR are the peripheric gas stations, namely the object of the present invention; RRC is the fuel delivering piping network; RF1 is the piping network for delivering the hydraulic fluid; and REL is the electric network.

Referring now to FIGS. 2 to 5, the peripheric gas station includes an outer tank 10 shaded as a rectangular parallelepiped of rugged metal sheet, and a cover 11 formed of a reinforced iron plate hinged at 12 to tank 10.

Figure 2:
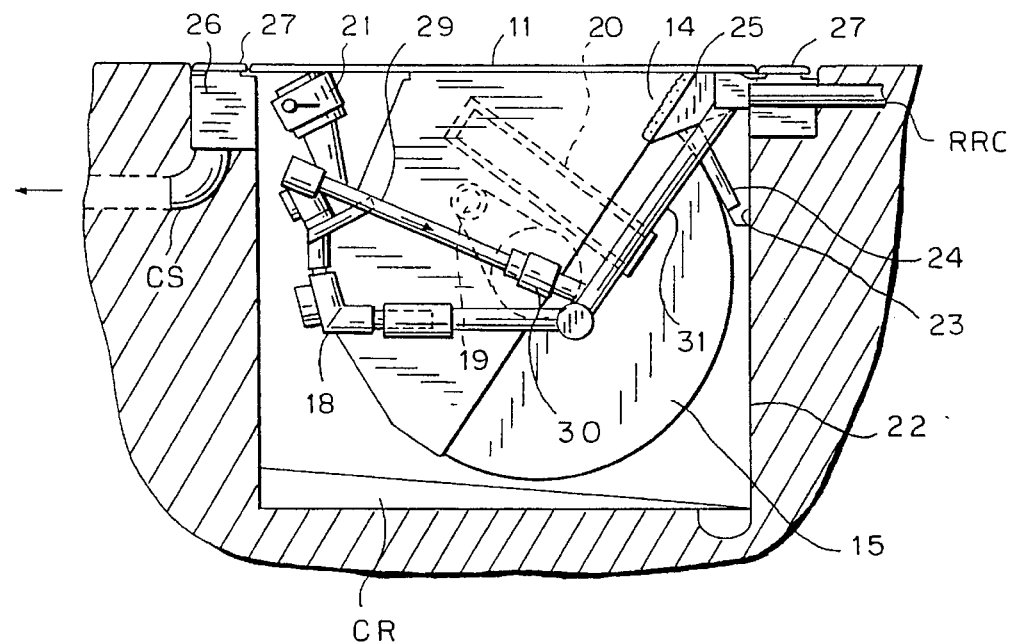
FIG. 2 is a longitudinal vertical section of a station in the rest position.
Figure 3:
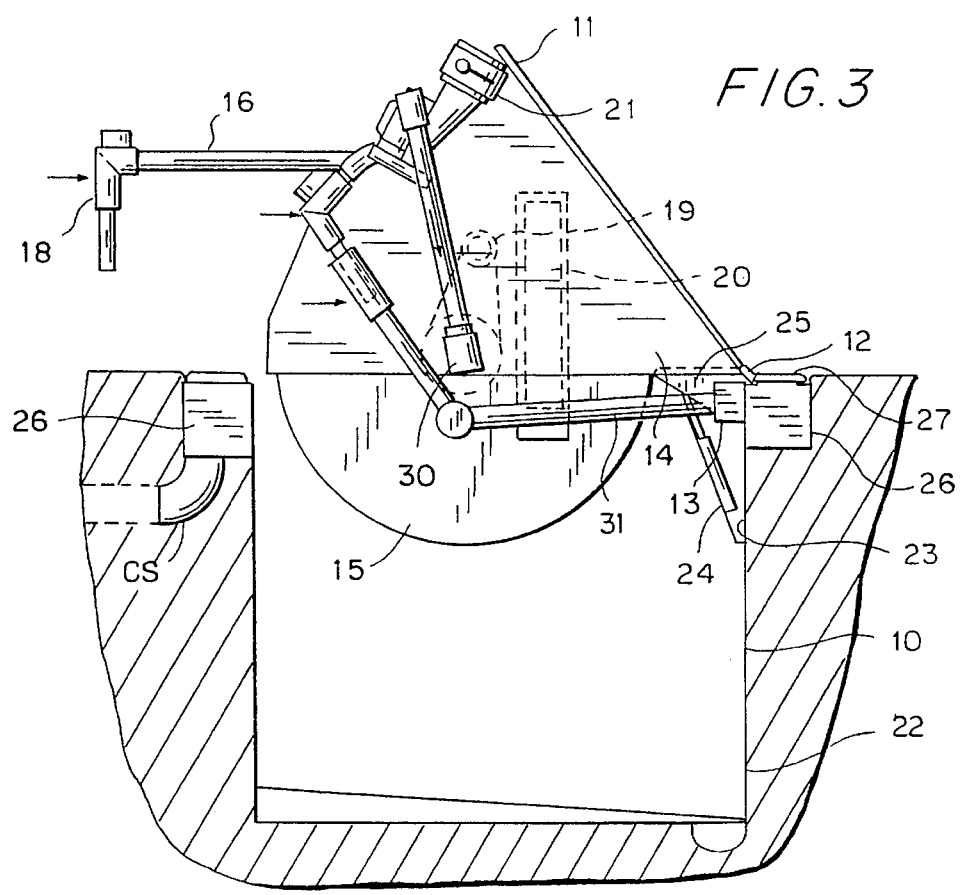
FIG. 3 is a similar section of the station but in the opened position.
Figure 4:
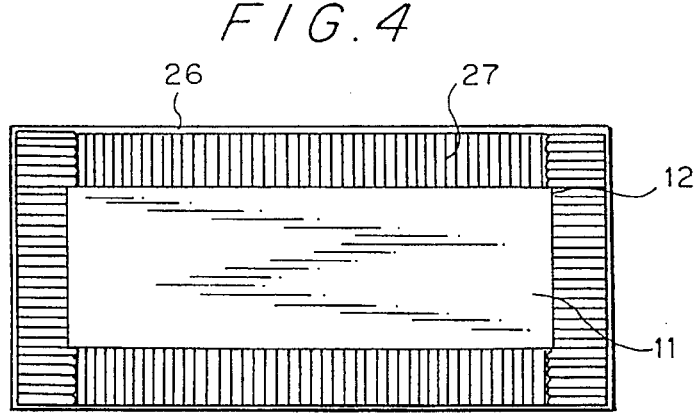
FIG. 4 is a top view of the station in the position of FIG. 2.
Figure 5:
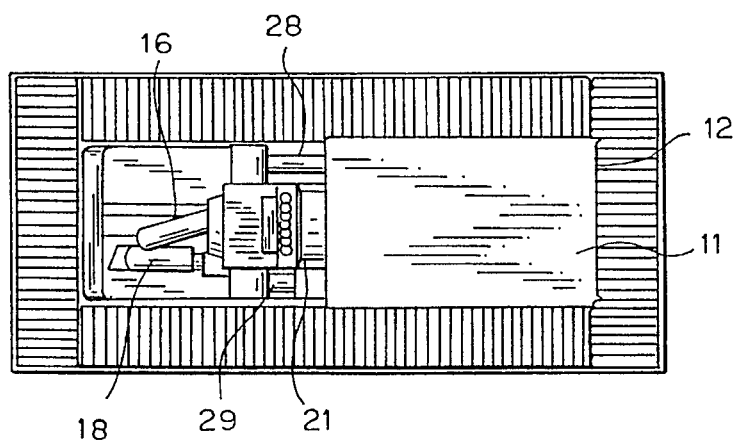
FIG. 5 is a similar view of the station but in the position of FIG. 3.

A frame 14 is hinged at 13 to tank 10 under the hinge of cover 11 so as to pivot between the position of FIG. 2 and that of FIG. 3.

Hinge 13 of the frame 14 is of the type described in Italian patent 1.104.199 to the same Applicant as the present application. It comprises a rotatable hollow joint into which fuel is supplied from the fuel delivering piping network to be introduced into rigid tubes of the peripheric gas station to feed fuel into the delivering gun 18 through the hose 16 of the reel 15.

Figure 6:
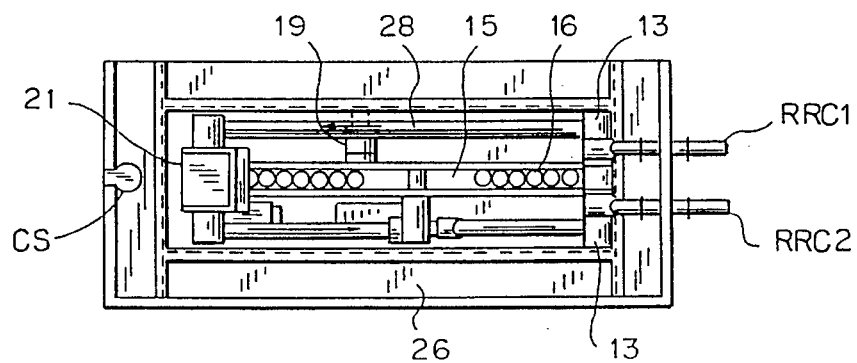
FIG. 6 is a similar view as FIG. 4 in which the cover plate is removed

Referring to FIGS. 2, 3 and 6 the hinge 13 connected to the inlet fuel pipe RRC1 is in fluid communication through a feeding tube 28 with the metering control panel 21. The metered portion of fuel to be delivered to the hose 16 is supplied through a tube 29 to a rotatable hollow joint 30 in fluid communication with the hollow shaft of reel 15 so as to be introduced into the delivering hose 16.

The excess fuel from the metering panel 21 is supplied to a by-pass tube 31 to be fed to the outlet fuel pipe RRC2 for recycle to the piping network.

All tubes 28, 29, 31 inside the peripheric gas station are rigid tubes.

Frame 14 is formed of rugged interconnected members of metal section and is intended to support all of the operating components of the peripheric station. More particularly, frame 14 supports reel 15 about which hose 16 provided with a delivering gun 18 is wound, a hydraulic motor 19 for re-winding reel 15, a filter 20, and a control panel 21 provided with relative meters (not shown).

One end of a hydraulic double-acting cylinder and piston assembly indicated at 24 is hinged at 23 to the wall 22 of tank 10, the other end being linked at 25 to pivoting frame 14 so that the extension and the contraction of assembly 24 cause frame 14 to raise and to lower, respectively. It should be appreciated that the raising of frame 14 causes cover 11 engaged therewith, to pivot.

Furthermore a gutter 26 protected by gratings 27 for carrying rain away to a Grain trunk line CS, is provided around tank 10 when the latter is received into hole CR (FIGS. 2 and 3).

In practice each peripheric station PPR is opened and operated by known control means controlled by the operator, for example, by a magnetic key or a radio signal or the like, which is transmitted by an electric low-voltage (usually 24 Volt) control line to the main station which is then operated in order that:

a) the delivering means of PPR can project outwards from or be retracted into the buried metal tank;

b) the fuel can be delivered at request:

It is evident that the number of PPR stations supplied by the same main station CCL with fuel and the distance of the former from the latter can be chosen at least theoretically at will, but of course the maximum fuel amount delivered at the same time to the several PPRs by the same main station CCL cannot exceed the maximum fuel delivery rate of the electropump of the main station itself.

Hose 16 wound about take-up reel 15 can be unwound manually (free unwinding) while the re-winding thereof is controlled by an oleodynamic motor 19 supplied with hydraulic fluid from the main station connected to the concealable PPR stations.

The oleodynamic connection between PPR stations indicated at RF1 consists of a buried two-way piping generally made of copper having a suitable section. Each peripheric gas station according to the invention is also provided with a socalled "antishearing" device of the per se known type which is installed under grating 27 and automatically prevents by means of an electrovalve the hydraulic cylinder and piston assembly 24 from being operated in case some weight, for example; a human or the hose 16 weighs on the grating.

Besides the described feature of fully concealing, the system of the invention with all of its components, which is essential for military installations, the peripheric station according to the invention has two further very attractive features:

a) the fully standing up of all components above the ground surface when the station is operated which assures the best accessibility and visibility for the operator, the best aeration of the station, which is important in case of volatile fuels, and many escape chances for the personnel in case of emergency such as fire; and b) the reduced height of the station in the opened position (see FIG. 3) which allows the socalled "hot refuelling", i.e. the refuelling of aircrafts and helicopters with running motors without the danger that wings collide with station components.

Although the station according to the invention has been illustrated and described with reference to its installation in an airport, it can also be installed in any other military plant in which the refuelling of several vehicles should be carried out at the same time.

What is claimed is:

1. In a peripheric refuelling point (PPR) in a protected and concealed refuelling station system including a) a fuel supply source (SS1,SS2);

b) a main remotely controlled delivering station (CCL) provided with
an electropump for delivering fuel from said fuel supplying source,
an oleodynamic control unit for delivering hydraulic fluid, and
an electric power supply;

c) a fuel delivering piping network (RRC) to be fed by said electropump;

d) a hydraulic fluid delivering piping network (RF1) to be fed by said oleodynamic control unit;

e) an electric network (REL) connected to said power supply;
said peripheric refuelling point (PPR) being connected to said main remotely controlled delivering station (CCL) through said fuel delivering piping network (RRC), said hydraulic fluid delivering piping network (RF1) and said electric network (REL) and said peripheric refuelling point (PPR), the improvement comprising:
an outer metal tank (10) of a parallelepipedic shape received into the ground;
an upper cover (11) for said tank (10) which has a hinge (12) at one side thereof;
a metal frame (14) which is hinged at said side of the tank under the hinge (12) of said cover so as to pivot between a lowered position and a raised position, said metal frame and said cover being engaged so as to drive the cover to pivot on the frame;
a take-up reel (15) pivotally supported by said metal frame and a fuel delivering hose (16) carried by said take-up reel in fluid communication with said fuel delivering piping network (RRC);

a hydraulic motor (19) for rewinding said take-up reel supported by said frame and controlled with the hydraulic fluid supplied from said main station through said fluid delivering piping network (RRC);

a cylinder and piston assembly (24) operating between said hinged frame and the wall (22) of said tank for causing the frame to raise and lower, said cylinder and piston assembly being operated by the hydraulic fluid delivered by oleodynamic control unit in said main remotely controlled delivering station through said fluid pipe network (RF1); and control means for remotely controlling said main delivering station through said electric network (REL), said electric network consisting of low voltage electric lines.

2. A peripheric refuelling point as claimed in claim 1, in which said low voltage is 24 volts.

3. A peripheric refuelling point as claimed in claim 1, in which said fuel supplying source (SS1, SS2) is a pipe of a fuel piping system.

4. A peripheric refuelling point as claimed in claim 1, in which said fuel supplying source (SS1, SS2) is a pipe of at least one buried tank.

* * * * *